Patented Oct. 18, 1949

2,485,330

UNITED STATES PATENT OFFICE 2,485,330

FUNGICIDAL COMPOSITIONS

William D. Stewart and John H. Standen, Yonkers, N. Y., assignors to The B. F. Goodrich Company, New York, N. Y., a corporation of New York No Drawing. Application October 1, 1945,
Serial No. 619,697

5 Claims. (Cl. 167—33)

This invention relates to pest control and more particularly to compositions which are useful as fungicides.

This invention has for its general object the provision of new and useful compositions having the power of killing and inhibiting the growth of economically harmful pests, specifically fungi, which prey on plant and animal matter either in its animate or inanimate or fabricated state. Other objects will appear hereinafter.

These objects are accomplished by the following invention of fungicidal compositions comprising as an active ingredient a beta-thiothiazyl beta'-halo dialkylether.

The thiothiazyl ethers with which this invention is concerned have the following general formula:

where R represents a thiazyl radical, X represents a halogen and $n$ is an integer from 2 to 4 inclusive. These thiothiazyl ethers can be conveniently prepared by reacting a dihalo dialkylether with a mercapto thiazole in the presence of aqueous sodium hydroxide. As a rule, in carrying out this reaction, an excess of the dihaloether is reacted with substantially equimolecular proportions of sodium hydroxide and the mercaptothiazole. The reaction is generally carried out in the presence of water as the reaction diluent. The reactants are mixed with water, and the mixture heated to a temperature of about 90 to 120° C. with stirring. When the reaction is complete, the mixture is washed with water and the desired products recovered by fractional distillation. If desired, the oily reaction product can be separated from the reaction mixture by decantation and used directly or after the unreacted dihaloether has been removed by distillation. Both the monosubstituted and disubstituted product of the dihaloether are generally produced in the reaction, but the monosubstituted product is obtained in good yield when an appreciable excess of the dihaloether is employed.

Any of the mercaptothiazole compounds can be employed in preparing the thioethers which are useful according to our invention. The mercaptothiazoles their preparation and other uses have been thoroughly discussed in prior patents and in the literature. There are among others, for example, unsubstituted 2-mercaptothiazole, 2-mercapto 4,5-dimethylthiazole, 2-mercapto 4-ethylthiazole, 2-mercapto benzothiazole, 2-mercapto naphthothiazole, 2-mercapto 4-phenylbenzothiazole, 2-mercapto 5-nitrobenzothiazole, 2-mercapto 6-chlorbenzothiazole, 2-mercapto 5-chlorbenzothiazole, 2-mercapto 6-nitrobenzothiazole, 2-mercapto 6-ethoxybenzothiazole, 2-mercapto alkylbenzothiazoles, and others.

Such dihalo dialkylethers as dichlordiethyl ether, dichlordibutyl ether, dichlordipropyl ether, and others, can be used in the preparation of these new fungicides. The dibromo ethers can also be used. Because of its availability, dichlordiethyl ether is the preferred reactant employed in preparing these fungicides.

We have discovered that these thiothiazyl ethers are highly efficient fungicides, being effective in concentrations as low as 100 P. P. M. against such fungi as Alternaria solani and Sclerotinia fructicola.

The thiothiazyl ethers with which this invention is concerned were tested to determine their fungicidal activity according to methods commonly employed in the art. The more detailed applications of the invention is illustrated by the following examples and descriptions which demonstrate the use of a specific thiothiazyl ether as a fungicide. In each test, various amounts of the specific thiothiazyl ether were employed, but only those tests which illustrate the remarkable effectiveness of the materials are given in detail.

Example I

In an agar plate test to determine fungicidal activity, there was incorporated into Difco malt extract agar beta-2-thio-4,5-dimethylthiazyl beta'-chloro diethylether. The agar mixture was poured into Petri dishes, and the nutrient was inoculated by spraying test sets with a spore suspension of Alternaria solani in some and with a spore suspension of Sclerotinia fructicola in others by means of an atomizer. By this treatment, it was found that the presence of 100 P. P. M. of this thiothiazyl ether prevented the germination of the spore of both fungi during a three day incubation of the cultures at 21° C.

Example II

In a spore suspension test to determine fungicidal activity, beta-2-thio-4,5-dimethylthiazyl beta'-chloro diethylether was added to spore suspensions of *Alternaria solani* and *Sclerotinia fructicola* in a 1% orange juice solution containing 50,000 spores/c. c. Small droplets of the mixtures were placed on microscope slides and held at 21° C. in a moist chamber for 18 to 24 hours. It was found that the presence of only 100 P. P. M. of this thiothiazyl ether prevented the germination of the spores of either fungus.

The thiothiazyl ethers made from the mercapto thiazole compounds and dihalo dialkyl ethers hereinbefore enumerated when employed in the above tests to determine fungicidal activity produce results comparable to those of beta-2-thio-4,5-dimethylthiazyl beta'-chloro diethylether.

These thiothiazyl ethers can be used in combination with other pesticides such as fungicides, insecticides and bactericides, to produce a general or all-purpose pesticidal composition. For example, there can be combined with these thiothiazyl ethers metallic arsenicals, fluosilicates, organic thiocyanates, phenothiazine, nicotine, pyrethrum, isobutylundecylenamide and others, to increase the general pesticidal killing power. These mixtures, as well as the thiothiazyl ethers may also be diluted with inert ingredients such as talc, calcium carbonate and tricalcium phosphate, or they may be dissolved or suspended in water, alcohol, petroleum hydrocarbons, or any other solvent or liquid diluent. Dispersing, wetting and spreading agents such as lauryl alcohol, long-chain alcohol sulfates, sulfated and sulfonated alcohols, sodium salts of sulfated alcohols, sulfonated aliphatic derivatives, sulfonated aromatic and alkylaryl derivatives, hexahydric alcohols, esters of fatty acids, pine oils and soybean lecithin may be used to aid in stabilizing the suspensions. Adhesives or sticking agents such as milk products, flour, gelatin, fish oils and others, may be incorporated into the mixtures to increase the retention or tenacity of spray and dust deposits.

By employing these thiothiazyl ethers in solutions, dispersions or dusts, they may be used as agents for protecting plants and animals or products derived therefrom such as wood, fur, silk, wool and other cellulosic materials, regenerated cellulose, cotton, leather, glue, paper, plant latices, trees and especially fruit trees, from molds (fungi) while the material to be protected is a raw material or finished product.

The solvents, dusts and aqueous dispersions generally employed for convenience of application of pesticidal compositions have the common property of permitting projection of the materials through suitable jets or nozzles onto the materials to be treated, and will be designated in the appended claims for convenience as "fluent carriers."

The above description and examples are intended to be illustrative of our invention and are not intended to impose any limitation thereon, for any modification of or variation therefrom which conforms to the spirit of the invention is intended to be included within the scope of the appended claims.

We claim:

1. A method of protecting materials which are capable of nourishing fungi from destruction by fungi which comprises bringing the material into contact with a thiothiazyl ether having the formula $$R—S—C_nH_{2n}—O—C_nH_{2n}—X$$

where R is a thiazyl radical, X is a halogen and $n$ is an integer from 2 to 4.

2. A method of protecting materials which are capable of nourishing fungi from destruction by fungi which comprises bringing the material into contact with a thiothiazyl ether having the formula $$R—S—C_2H_4—O—C_2H_4—X$$

where R is a thiazyl radical and X is a halogen.

3. A method of protecting materials which are capable of nourishing fungi from destruction by fungi which comprises bringing the material into contact with a thiothiazyl ether having the $$R—S—C_2H_4—O—C_2H_4—Cl$$

where R is a thiazyl radical.

4 A method of protecting materials which are capable of nourishing fungi from destruction by fungi which comprises bringing the material into contact with a thiothiazyl ether having the formula $$Z—S—C_2H_4—O—C_2H_4—Cl$$

where Z is an alkylthiazyl radical.

5. A method of protecting materials which are capable of nourishing fungi from destruction by fungi which comprises bringing the material into contact with beta-2-thio-4,5-dimethylthiazyl beta'-chloro diethylether.

WILLIAM D. STEWART.
JOHN H. STANDEN.

REFERENCES CITED

The following references are of record in the file of this patent:

UNITED STATES PATENTS

| Number | Name | Date |
|---|---|---|
| 1,961,840 | Bolton | June 5, 1934 |
| 1,962,109 | Alvord | June 5, 1934 |
| 2,248,356 | Jones | July 8, 1941 |
| 2,352,078 | Coleman et al. | June 20, 1944 |